June 2, 1970     T. McMANUS ET AL     3,514,866
METHOD OF RAPIDLY COOLING HOT PYROPHORIC DUST
Filed Oct. 28, 1968
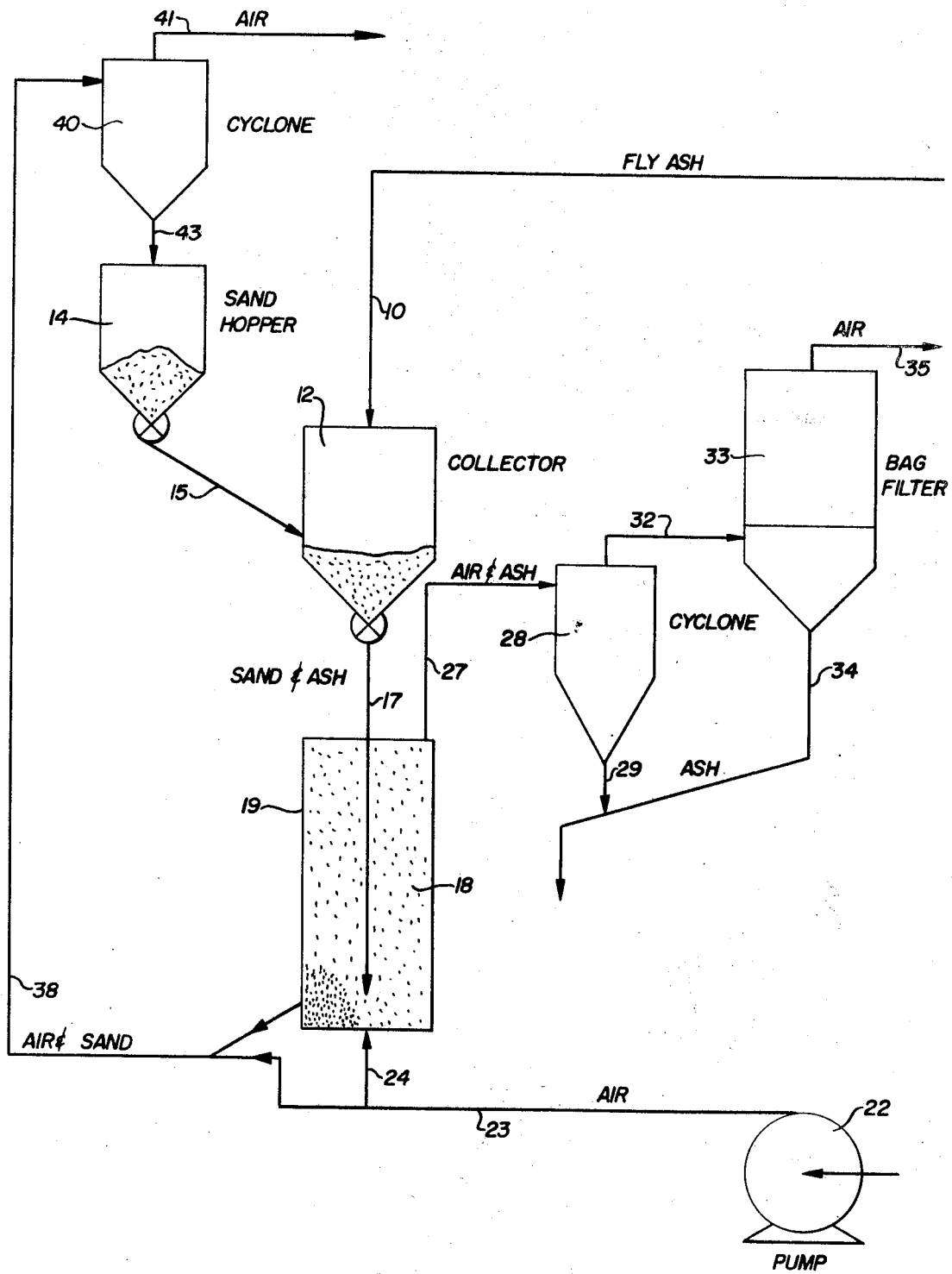
INVENTORS
THOMAS McMANUS
JAN C. HOLLEMANS
BY
Fetherstonhaugh & Co.
ATTORNEYS United States Patent Office 3,514,866
Patented June 2, 1970

3,514,866
METHOD OF RAPIDLY COOLING HOT
PYROPHORIC DUST
Thomas McManus, North Vancouver, and Jan C.
Hollemans, Vancouver, British Columbia, Canada,
assignors to MacMillan Bloedel Limited, Vancouver, British Columbia, Canada
Filed Oct. 28, 1968, Ser. No. 771,051
Int. Cl. F26b 3/00
U.S. Cl. 34—9                                               7 Claims

ABSTRACT OF THE DISCLOSURE

The method of rapidly cooling hot pyrophoric dust including mixing the hot dust with a cool, inert and incombustible particulate material, forming a bed of this mixture, fluidizing the bed with a gas further to cool and to entrain the dust, and separating the dust-laden gas from the particulate material. The entrained dust is mechanically separated from the gas.

Background of the invention

This invention relates to a method of rapidly cooling hot pyrophoric dust without creating any disposal problems.

The problem of rapidly cooling hot pyrophoric dust results from the fact that this dust will ignite when brought into contact with cooling air. This condition then creates further problems. For example, fly ash is separated from the flue gas of hog fuel boilers and the like by passing the gas through multicloves in order to reduce air pollution and to avoid starting fires in the territory where the boilers are located. If the hot fly ash were brought directly into contact with cooling air, it would ignite, and the carbon content would be reduced, but the problem of the fly ash would still remain. Prior to this invention, the separated fly ash was handled in two ways. It was either returned directly to the boiler for re-combustion, or it was slurried with water and recovered after a settling and filtering operation.

Neither of these two courses is entirely satisfactory. Direct return of the collected ash to the boiler simply reduces the carbon content of the circulating fly ash but has the opposite effect on the amount of the ash accumulating in the system. Morover much of the returned ash and inorganic contaminants are swept up by the combustion gases and deposited on or abrade the boiler tubes thereby reducing tube life and boiler efficiency. Removing the ash by the wet method simply exchanges one pollution problem for another since the water used has to be disposed of.

Summary of the invention

The object of the present invention is to eliminate the problems set out above relative to fly ash and other pyrophoric dusts. The method according to the present invention comprises mixing the hot pyrophoric dust with a cool, inert and incombustible particulate material, forming a bed of the dust-particulate material mixture, fluidizing the bed with a gas further to cool the dust and to entrain the latter, and separating the dust-laden gas from the particulate material. It is desirable to separate the entrained dust from the gas, and this is preferably done mechanically, such as by means of a cyclone.

The particulate material absorbs heat from the dust, thereby rapidly cooling the latter below its ignition temperature. The fluidizing gas, which may be any desired gas, but usually is air, is brought into intimate contact with the dust particles during the fluidizing of the bed so that the dust is very rapidly cooled. At the same time, the gas moving through the bed entrains the dust and removes it from the bed. It is very easy to separate the dust from the gas so that dust can be dealt with in any desired manner, and the gas discharged without contaminating or polluting the atmosphere. One of the advantages of this method is that it can be carried on continuously with very little attention.

Description of the preferred embodiments

As this invention is particularly applicable to fly ash, it will be described in connection with it, but it is to be understood that the method may be applied to the cooling of any hot pyrophoric dust.

After the fly ash has been separated from the flue gas of the boilers by passing the gas through multicloves on other suitable separators, it is mixed with a cool, inert and incombustible material in particulate form so that some of the heat of the ash is transferred therefrom to the particulate material. Sand is usually used for this purpose since it is cheap and readily available, although any other suitable particulate material may be used, such as powdered bauxite, quartz, limestone or glass. The mixed sand and ash are directed into a container to form a bed therein, and a cool gas, usually air, is directed through this bed at a velocity sufficient to fluidize the sand. The gas travels through the sand and the fly ash, and said ash being much lighter than the sand readily separates from the latter while being rapidly cooled by the moving gas. The gas also carries the ash away from the bed, and the ash-laden gas is directed to a separator such as a cyclone, where the cooled ash is separated from the gas.

As stated above, one of the advantages of this method method is that it can be carried on continuously. The hot pyrophoric ash is continuously directed into a collector, and the sand also is directed into this collector where it is mixed with the ash. The ash-sand mixture is removed from the bottom of the collector and is directed into the midst of a fluidized bed of these materials. Air is directed upwardy through the bed at a velocity sufficient to fluidize the relatively heavy sand particles. As the sand is kept in a fluidized state, the air moving through the bed rapidly cools the ash and the sand, and its velocity is such that it entrains the ash and carries the latter along with it. The ash-ladden air is directed to a cyclone where the ash is separated from the air. Sand is continuously removed from the bottom of the container and is directed back to the collector or the particulate system. If necessary, this sand can be further cooled by air and then separated therefrom in a cyclone before being directed back for re-use.

Description of preferred apparatus embodiments

The figure of the drawings diagrammatically illustrates one apparatus arrangement for carrying out the method of this invention. Temperatures and amounts of materials are inclined in order to show one practical application of this invention. Fly ash at about 400° F. and at the rate of around 1500 pounds per hour is directed through pipe 10 into a collector 12. Cool sand is directed from hopper 14 through pipe 15 into collector 12 where the sand and ash are mixed in any suitable manner. If desired, the sand and ash may be mixed before reaching collector 12 by any suitable apparatus, such as an inclined rotating drum mixer, not shown. This sand is supplied at the rate of about 2000 pounds per hour at a temperature of 100° F. more or less. The ash-sand mixture is directed through pipe 17 into the middle of a fluidized bed 18 within a container 19. Air is directed by pump 22 through pipes 23 and 24 into the bottom of container 19. This air is delivered at a rate of about 600 c.f.m. and at a temperature of approximately 50° F.

The velocity of the supplied air is sufficient to fluidize the sand particles in bed 18, and this cools both the sand and the ash. The upwardly-moving air entrains the ash, and the two travel through pipe 27 to a cyclone 28 where the ash is separated from the air. Fly ash is directed out of the bottom of the cyclone through pipe 29 at a rate of about 1500 pounds per hour and at a temperature of around 150° F. If desired, the separate air may travel through pipe 32 to a small bag filter 33, and any dust removed therefrom is directed out of the filter through pipe 34. Air travels out of the top of this filter through pipe 35 at the rate of about 600 c.f.m. and at a temperature of approximately 150° F.

Sand is removed from the bottom of container 19 through pipe 38 at a rate of about 2000 pounds per hour and at a temperature in the neighborhood of 150° F. Air from blower 22 may be used to move this sand and at the same time cool it. In this case, pipe 38 leads to a cyclone 40 where the air is separated from the sand and discharged through pipe 41 at about 400 c.f.m. and a temperature of about 100° F. The separated sand travels through pipe 43 into hopper 14.

Any lumps of fly ash present in fluidized bed 18 will remain therein only until the grinding effect of the sand reduces the lumps until the ash thereof can readily be entrained by the air.

We claim:

1. The method of rapidly cooling hot pyrophoric dust, which comprises mixing the hot dust with a cool, inert and incombustible particulate material, forming a bed of the dust-particulate material mixture, fluidizing the bed with a gas further to cool and to entrain the dust, and separating the dust-laden gas from the particulate material.

2. The method as claimed in claim 1 including the step of mechanically separating the entrained dust from the gas.

3. The method of rapidly cooling hot pyrophoric dust, which comprises mixing a cool, inert and incombustible material in particulate form with the hot dust so that some heat is transferred from the dust to the particulate material, directing said mixed particulate material and dust into a container to form a bed therein, directing cool gas through said bed at a velocity sufficient to fluidize the particulate material, said gas separating the dust from the particulate material, rapidly cooling the dust and carrying said dust away from the bed, and separating the dust from the gas.

4. The method as claimed in claim 3 in which the dust is continuously mixed with the particulate material and the mixture continuously directed into the container, dust-free particulate material is continuously removed from said bed near the bottom thereof, and the dust-laden gas is continuously removed from the container.

5. The method of rapidly cooling hot pyrophoric dust, which comprises directing hot pyrophoric dust into a collector, directing cool, inert and incombustible material in particulate form into the collector to mix with the dust, directing the dust-particulate material mixture into a container to form a bed therein, directing gas upwardly through the bed at a velocity sufficient to fluidize the particulate material of the bed and separate the dust therefrom, and directing the dust-laden gas to a separator to remove the dust from the gas.

6. The method as claimed in claim 5 including removing particulate material from near the bottom of the bed in the container, and directing said removed material back to the collector.

7. The method as claimed in claim 5 including removing particulate material from near the bottom of the bed in the container, blowing the removed particulate material by an air stream into a cyclone thereby cooling said material and separating the latter from the air stream, and directing the particulate material from said cyclone to said collector for re-use.

References Cited

UNITED STATES PATENTS 3,261,463   7/1966   Eveson et al. _____ 34—9 X

JOHN J. CAMBY, Primary Examiner

U.S. Cl. X.R.

110—165